United States Patent

[11] 3,532,034

[72] Inventor George L. Buc
Fairfax, Virginia
[21] Appl. No. 635,627
[22] Filed May 2, 1967
[45] Patented Oct. 6, 1970
[73] Assignee Farrington Electronics Inc.
Springfield, Virginia
a corporation of Massachusetts

[54] ILLUMINATION TECHNIQUE FOR OPTICAL CHARACTER RECOGNITION
2 Claims, 6 Drawing Figs.

[52] U.S. Cl. .......... 95/4.5, 340/378
[51] Int. Cl. .......... B41b 41/08
[50] Field of Search .......... 95/4.5.85; 355/67, 71; 340/378; 350/150

[56] References Cited

UNITED STATES PATENTS 2,291,347 7/1942 Ryan .......... 355/71
3,263,584 8/1966 Knus .......... 355/67

*Primary Examiner*—John M. Horan
*Attorney*—Gerald J. Ferguson, Jr.

ABSTRACT: Method of optically processing characters composed of non-copper containing materials denoted on the face of a counting device constructed at least in part from a metal alloy including copper whereby the imaged characters are displayed in blue light so as to make the metal alloy appear darker.

Figure 1:
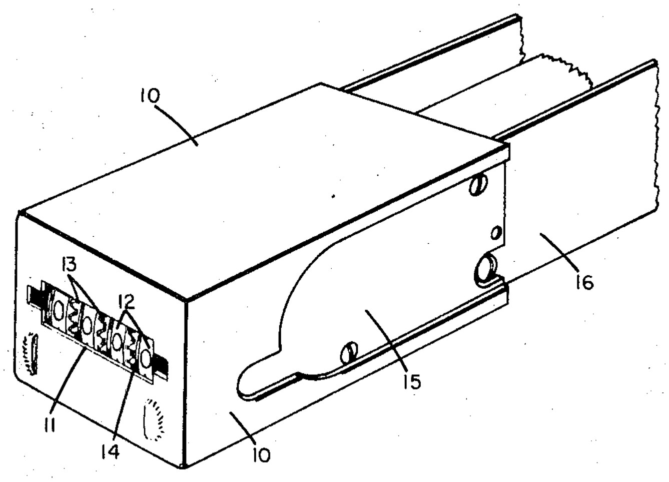

Inventor
GEORGE L. BUC

By Jacob Frank
Attorney

INVENTOR
GEORGE L. BUC

BY

ILLUMINATION TECHNIQUE FOR OPTICAL CHARACTER RECOGNITION

A method and apparatus for reducing metallic luster interference with indicia printed on a counter, such as a meter, calculator or the like, when the indicia are photographed or directed for machine reading by optics from the counter. The specific metal alloys involved which cause the interference we are concerned with, are those comprising the element copper, and the manner of accomplishing the above is by utilizing a photography arrangement comprising: a linear polarizer over a light source that illuminates the counter, a linear polarizer over a camera lens focused on the counter and in addition a blue filter placed over the camera lens or light source or both.

In data processing systems employing meters or similar devices comprising counters having digit wheels bearing printed indicia, it is desirable to provide for some form of automatic data acquisition to record the particular indicia displayed at some point in time or continuously, as the present technique of manually transforming the data into punched cards etc., by a direct reading process via photographs is not only time consuming but in addition are by no means error free. However, for means of economy, it is quite obvious that old digit wheels presently in use cannot be replaced by devices to permit continuous or intermitted automatic data acquisition. The instant invention concerns a photograph transcription technique for use with optical character recognition equipment.

The present invention relates to the field of optical character recognition, and more particularly, to a technique for photographing or displaying indicia on counters wherein the photograph or display produced is to be directly or indirectly employed for reading purposes by optical character recognition equipment. Although machines to read printed indicia directly from counters or from photographs of the counters can be designed, difficulties arise because the counters often have shiny metallic parts that photograph in such a way that expensive logical electronic methods are required to distinquish the images of non numeric parts of the counters from the numerals. Even when humans read the numerals photographed, errors could easily occur should the photographs be read too quickly. Normally if the indicia on such photographs is pertinent to billing, error free performance would be required and the photographs would normally have to be read slowly. The reason for the shiny metallic parts is the fact that commercial counters of the type made mention of, usually are alloys such as brass, bronze and the like containing copper as an ingredient.

The general purpose of this invention is to obviate the above noted drawbacks encountered in the direct or indirect optical machine reading of the counters, by greatly reducing the interference introduced by the shiny metal alloys comprising the element copper. To attain this, the present invention contemplates the use of a linear polarizer over the light source illuminating the counter and one crossed with the first one over the lens of the camera (or the scanning apparatus), and in addition, a blue filter is placed over the lens of the camera (or scanning apparatus), or over the light source, or even over both the lens and the light source.

In the drawings:

FIG. 1 is a perspective view showing one type of counter that could be used in accordance with the present invention.

Figure 2A:
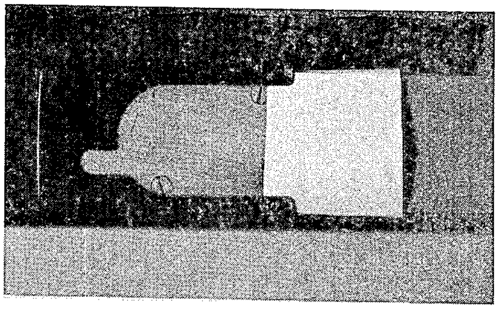

FIG. 2*a* is a photograph, illustrating the metallic luster interference relative to a white surface caused by metal alloys containing the element copper.

Figure 2B:
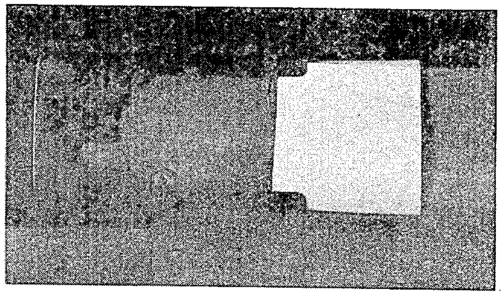

FIG. 2*b* is a photograph, illustrating the reduction of metallic luster interference when using a blue filter for photographing metal alloys containing copper.

Figure 3:
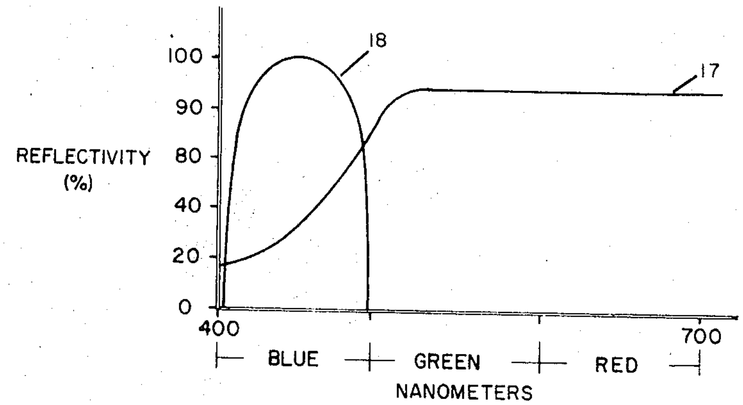

FIG. 3 shows a graph illustrating the spectral reflectivity versus wavelength characteristic of a metal alloy object containing copper.

Figure 4A:
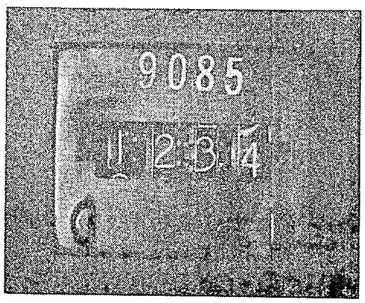

FIG. 4*a* is a photograph, illustrating a brass counter comprising digit wheels having white indicia printed thereon, the photograph having been taken in blue light.

Figure 4B:
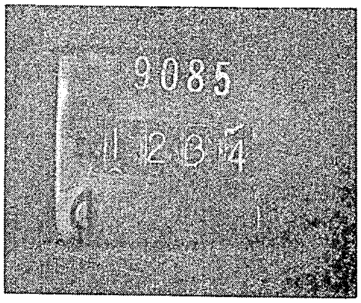

FIG. 4*b* is a photograph, illustrating the elimination of interference on a brass counter having printed white digits, by utilizing a blue filter and polarizers to significantly increase the contrast between the brass and white digits.

With reference to FIG. 1, there is shown a typical counter with which the present invention might be used, wherein a worn brass face plate 10 painted black, has an aperture 11 whereat appears a number of brass wheels 12 each having separate gear teeth 13. The outer periphery of each brass wheel 12 is also painted black with white digits positioned thereabout except at the edge areas 14 and gear teeth 13. At one side of the counter there is disclosed a portion of face plate 10 painted black, a brass side plate 15 and an aluminum housing 16.

For illustration purposes, a conventional photograph of the counter side is shown in FIG. 2*a* with a piece of white material or paint 17 having been laid upon a portion of the aluminum housing. It is observed, that although brass side plate 15 may be darker than white surface 17, it is not very dark and gives off a light shining appearance. In FIG. 2*b*, a photograph has been taken with a blue filter over the camera lens, and within the photograph itself brass side plate 15 has substantially darkened relative to the white surface 17, however, as may be seen, the brass screw heads still present some interference.

In explanation of the effect of the blue filter in photographing metal alloys containing copper, attention is directed to FIG. 3, which depicts a graph illustrating the spectral reflectivity in percent versus wavelength in a selected area of the visual spectrum, wherein curve 17 represents the reflectivity versus wavelength characteristic of a metal alloy object containing copper. Curve 18, in the same graph, represents the transmission curve of a blue filter. From the above, it may be readily seen that when a blue filter is positioned between the camera lens and the object, the only light reflected from the metal alloy object containing copper which will pass through the blue filter according to curve 17, is in that portion (blue) of the visual spectrum where the object is its darkest. Therefore, in taking a photograph with a blue filter, as shown in FIG. 2*b*, the brass side plate 15 will darken. FIG. 4*a* depicts the counter face photographed in blue light, and there is an improvement in the elimination of interference that would otherwise appear by the use of white light. To obtain the photograph of the counter shown in FIG. 4*b*, in addition to a blue filter over the lens, a linear polarizer is positioned over the lens and light source. If desired, a blue filter might also be placed over each, the lens and the light source. It may be readily observed from FIG. 4*b* that all interference in the neighborhood of the digit wheels is virtually eliminated by the combination of the filter and polarizers, and the contrast between the brass and white digits has been significantly increased. In operation, for example, a man at appropriate intervals would go out and photograph with the instant technique, the water, gas or electric meter in each of a number of buildings. Each meter might have the customers name and account number just over the digit wheels so that each photograph would contain all the necessary data. Errors of transcription resulting in error of customer identification or amount could not occur. When developed the film would provide indicia of characters with minimum interference and thereby readable by optical character recognition equipment. Of course, it would be necessary to provide for proper registration of the indicia within the scanning field in the character reader. This could be readily achieved by providing at least two points on the counter face for registration or alignment purposes with corresponding points on the camera, enabling the counter indicia to be recorded at a selected position relative to a film edge enabling good registration at the scanner station.

Another application of the present invention could be in the direct reading of a counter by a scanning device for optical character recognition purposes or merely for data transmission purposes, wherein a CRT display of a program might be called for along with data like information indicative of angle, time number etc., which latter data would be represented by a number or digit wheels. For such applications, a modification of the camera can be implemented where the illumination for digit wheels alone is filtered and polarized.

Recently, enacted laws in some countries permit the use of microfilm as a substitute for original documents, allowing, for example, a file requirement of five hundred thousand files to be reduced to a space of about 1 cubic yard. Instruments like checks and invoices which must be eventually returned to the signer to complete the transaction, could be microfilmed for record purposes. In order to microfilm along with such instruments data such as, the date of receipt, the receiving station identity, the operator's identity etc., digit wheels could be set in the microfilm field and recorded simultaneously with the instrument by utilizing the instant technique. Thus, the microfilmed instrument containing all the necessary data could be scanned instead of waiting to scan the original documents as is presently being done, thereby reducing the time interval between receipt of the instrument and collection of the money it represents.

Hence, while preferred applications of the invention have been described and are referred to it is to be understood that the present embodiment is capable of further applications.

I claim:

1. A method of optically processing characters composed of non-copper containing materials and their immediate environment for machine optical character recognition purposes, said characters being denoted on the face of a counting device constructed at least in part from a metal alloy including copper, said method reducing the reflected light interference caused by the metal alloy and comprising:

illuminating a surface of said counting device and said characters with a linearly polarized beam of light;

imaging at a plane the light reflected from the characters and the surface of the counting device through a first linear polarizer crossed with said polarized beam of light; and employing a blue filter for displaying the characters denoted on the counter face in that portion of the visual spectrum related to blue light so as to make the metal alloy appear darker.

2. The method according to claim 1, including directing a beam of light through a second linear polarizer to provide said polarized beam of light.